United States Patent
Rahamat et al.

(10) Patent No.: US 10,351,259 B2
(45) Date of Patent: Jul. 16, 2019

(54) ULTRA-THIN METALLIC FOIL FOR LIGHTNING STRIKE PROTECTION

(71) Applicant: Airbus SAS, Blagnac (FR)

(72) Inventors: Mohammed Salim Rahamat, Wolcott, CT (US); Mark A. Murdoch, Somers, CT (US); Kenneth William Burtt, Portland, CT (US); Brett Alexander Macdonald, Bristol, CT (US); Franck Flourens, Blagnac (FR); Richard Murillo, Blagnac (FR); Valentin Garciá Martínez, Madrid (ES); Pablo Perez Cabrero, Madrid (ES)

(73) Assignee: Airbus SAS, Blagnac (FR)

( * ) Notice: Subject to any disclaimer, the term of this patent is extended or adjusted under 35 U.S.C. 154(b) by 0 days.

(21) Appl. No.: 15/973,905

(22) Filed: May 8, 2018

(65) Prior Publication Data

US 2018/0257790 A1 Sep. 13, 2018

(51) Int. Cl.
*B64D 45/02* (2006.01)
*B26F 1/02* (2006.01)
(Continued)

(52) U.S. Cl.
CPC ............ *B64D 45/02* (2013.01); *B23K 26/082* (2015.10); *B23K 26/38* (2013.01); *B23K 26/384* (2015.10);
(Continued)

(58) Field of Classification Search
CPC ........ B64D 45/02; B23K 26/38; B23K 26/40; B23K 2103/10; B23K 26/384; B23K 2101/006; B23K 2101/18; B23K 26/082; B26F 1/02; C23C 30/00; C23C 30/005; C23C 2222/20; C23C 2222/00; C23C 28/04; C23C 28/046; C23C 28/34;
(Continued)

(56) References Cited

U.S. PATENT DOCUMENTS 3,989,984 A 11/1976 Amason et al.
5,370,921 A 12/1994 Cedarleaf
(Continued)

FOREIGN PATENT DOCUMENTS

JP 2015-156939 * 9/2015

OTHER PUBLICATIONS

Machine Translation, Tosaka Minoru, JP 2015-156939, Sep. 2015. (Year: 2015).*

(Continued)

*Primary Examiner* — Michael E. La Villa
(74) *Attorney, Agent, or Firm* — Greer, Burns & Crain, Ltd.

(57) ABSTRACT

A metallic foil for lightning strike protection in a composite aerospace structure having a length, a width, and a thickness of not more than 30 microns. There are a plurality of pores of a predefined geometric shape extending through the thickness of the metallic foil and being distributed across a surface area defined by the length and the width of the metallic foil. The plurality of pores in the aggregate define an open area of not more than 40% of the surface area and the metallic foil has a weight of not more than 115 g/m$^2$. The metallic foil has a weight to conductivity ratio of not more than 0.40 gram-ohms per square.

15 Claims, 9 Drawing Sheets

(51) Int. Cl.
| | |
|---|---|
| B23K 26/38 | (2014.01) |
| B32B 15/08 | (2006.01) |
| B32B 15/20 | (2006.01) |
| C23C 28/04 | (2006.01) |
| C23C 30/00 | (2006.01) |
| C23C 28/00 | (2006.01) |
| B32B 15/04 | (2006.01) |
| B23K 26/40 | (2014.01) |
| B23K 26/082 | (2014.01) |
| B23K 26/384 | (2014.01) |
| B23K 101/00 | (2006.01) |
| B23K 101/18 | (2006.01) |
| B23K 103/10 | (2006.01) |

(52) U.S. Cl.
CPC ............... *B23K 26/40* (2013.01); *B26F 1/02* (2013.01); *B32B 15/04* (2013.01); *B32B 15/08* (2013.01); *B32B 15/20* (2013.01); *C23C 28/04* (2013.01); *C23C 28/046* (2013.01); *C23C 28/34* (2013.01); *C23C 28/345* (2013.01); *C23C 30/00* (2013.01); *C23C 30/005* (2013.01); *B23K 2101/006* (2018.08); *B23K 2101/18* (2018.08); *B23K 2103/10* (2018.08); *C23C 2222/20* (2013.01); *Y10T 428/1266* (2015.01); *Y10T 428/1291* (2015.01); *Y10T 428/12361* (2015.01); *Y10T 428/12368* (2015.01); *Y10T 428/12431* (2015.01); *Y10T 428/12438* (2015.01); *Y10T 428/12569* (2015.01); *Y10T 428/12611* (2015.01); *Y10T 428/12618* (2015.01); *Y10T 428/12667* (2015.01); *Y10T 428/12882* (2015.01); *Y10T 428/12903* (2015.01); *Y10T 428/24273* (2015.01); *Y10T 428/24281* (2015.01); *Y10T 428/24289* (2015.01); *Y10T 428/24298* (2015.01); *Y10T 428/24306* (2015.01); *Y10T 428/24314* (2015.01); *Y10T 428/24388* (2015.01); *Y10T 428/24413* (2015.01)

(58) Field of Classification Search
CPC ....... C23C 28/345; B32B 15/04; B32B 15/08; B32B 15/20; Y10T 428/24273; Y10T 428/24281; Y10T 428/24289; Y10T 428/24298; Y10T 428/24306; Y10T 428/24388; Y10T 428/24314; Y10T 428/24413; Y10T 428/12431; Y10T 428/12361; Y10T 428/12368; Y10T 428/12438; Y10T 428/12569; Y10T 428/12611; Y10T 428/12618; Y10T 428/1266; Y10T 428/12667; Y10T 428/12882; Y10T 428/12903; Y10T 428/1291

See application file for complete search history.

(56) References Cited

U.S. PATENT DOCUMENTS

| | | |
|---|---|---|
| 5,806,796 A | 9/1998 | Healey |
| 2010/0263898 A1 | 10/2010 | Hebert |
| 2013/0271891 A1 | 10/2013 | Shimp et al. |
| 2015/0087782 A1* | 3/2015 | Hoshino ............... B32B 27/26 524/853 |
| 2016/0046385 A1 | 2/2016 | Brown et al. |

OTHER PUBLICATIONS

Dexmet Corporation's "End Item" description sheet of the 175 gsm product (142 micron thick).

* cited by examiner

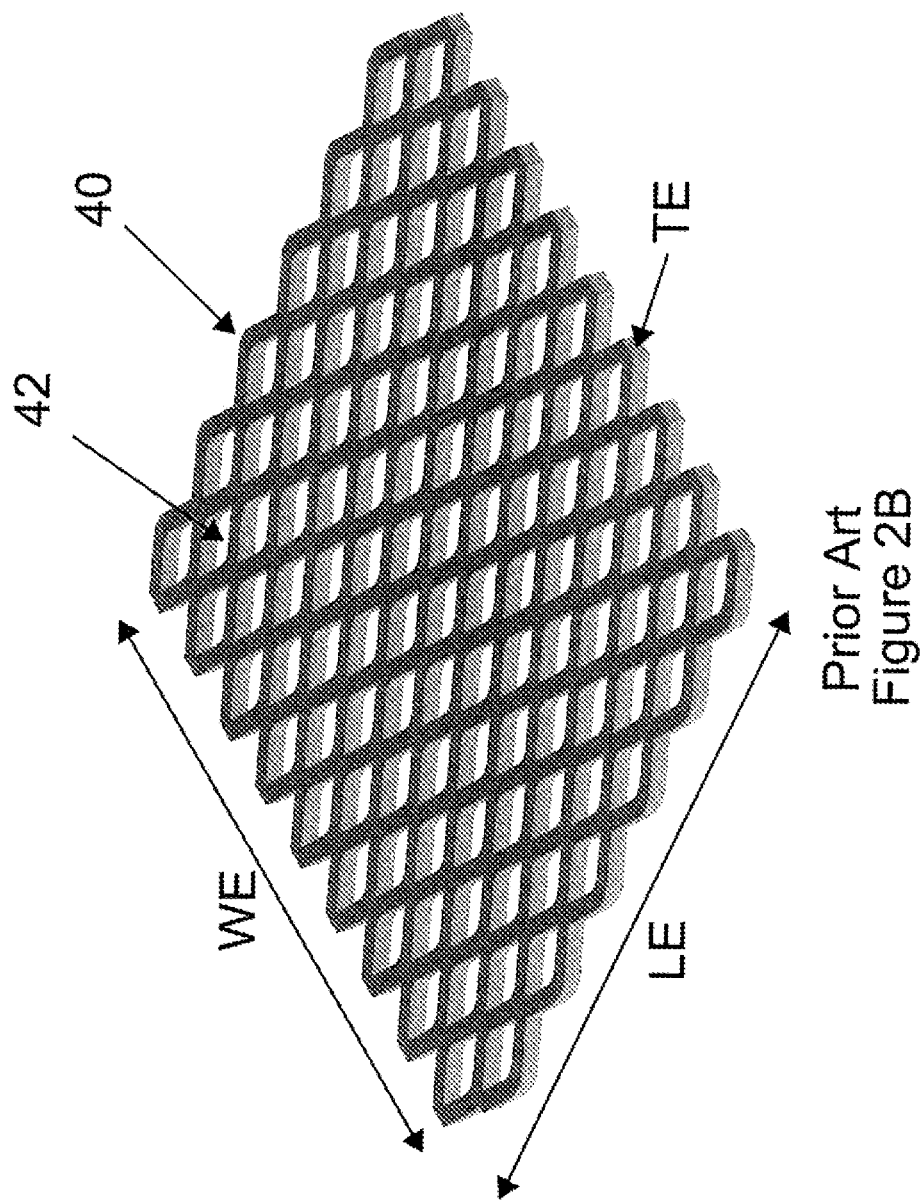

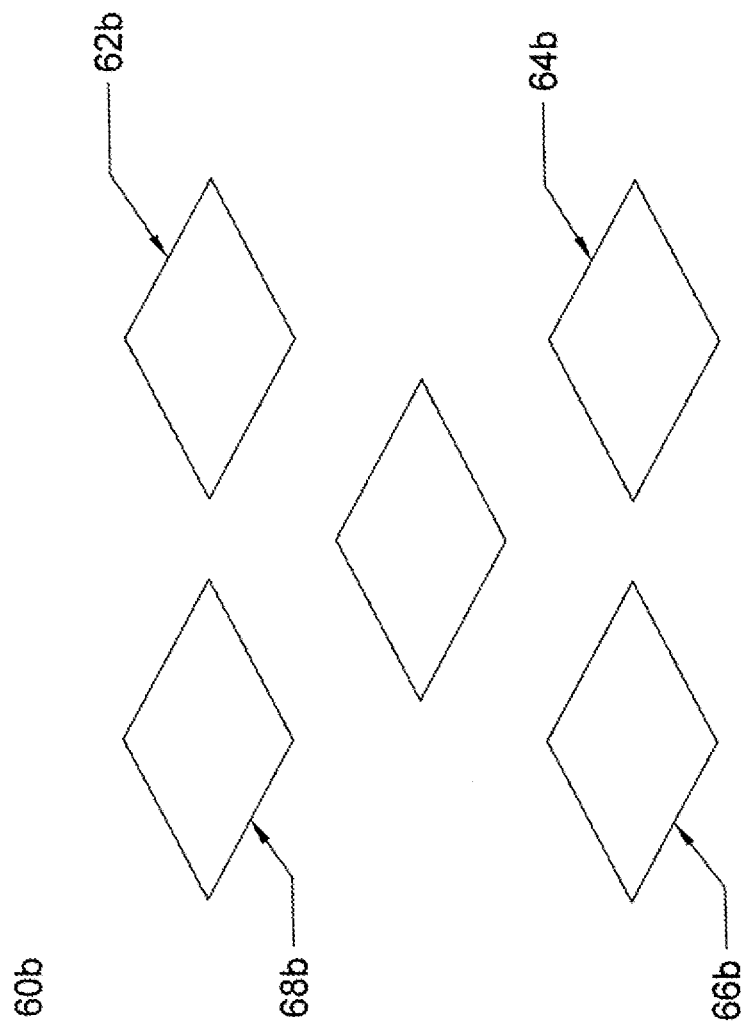

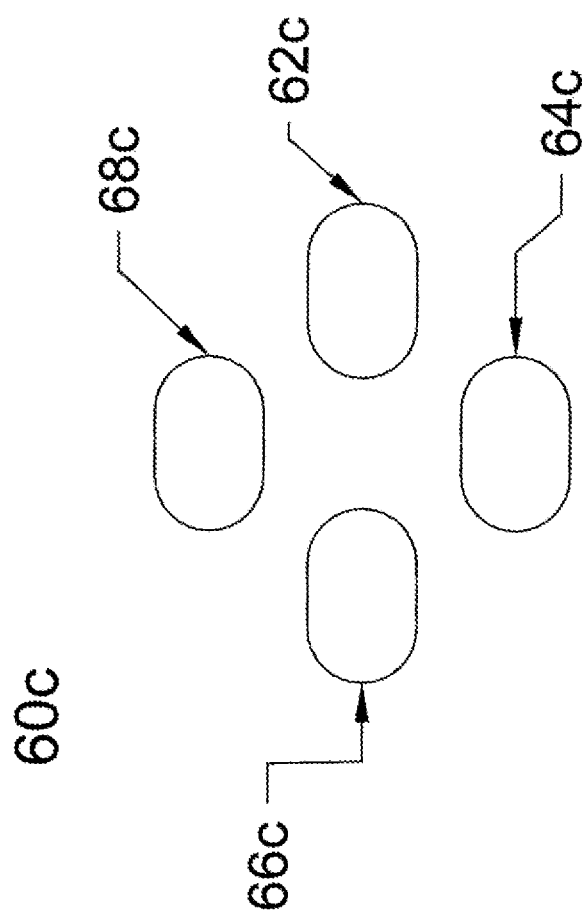

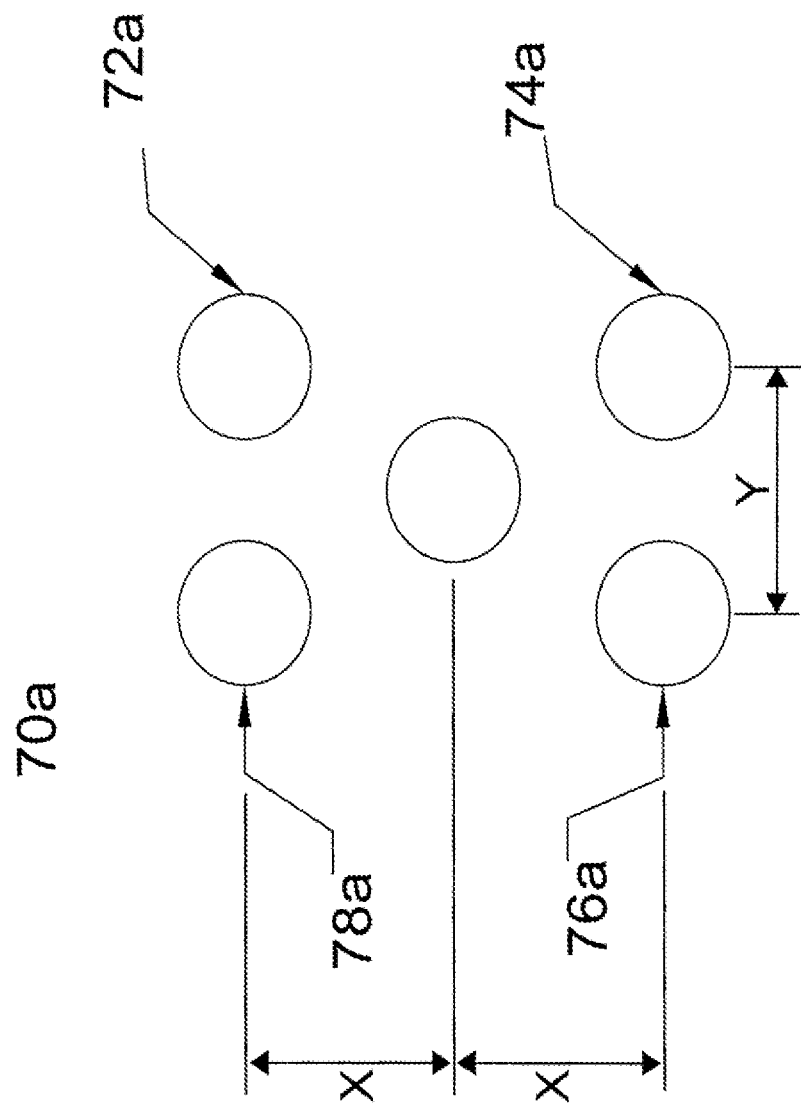

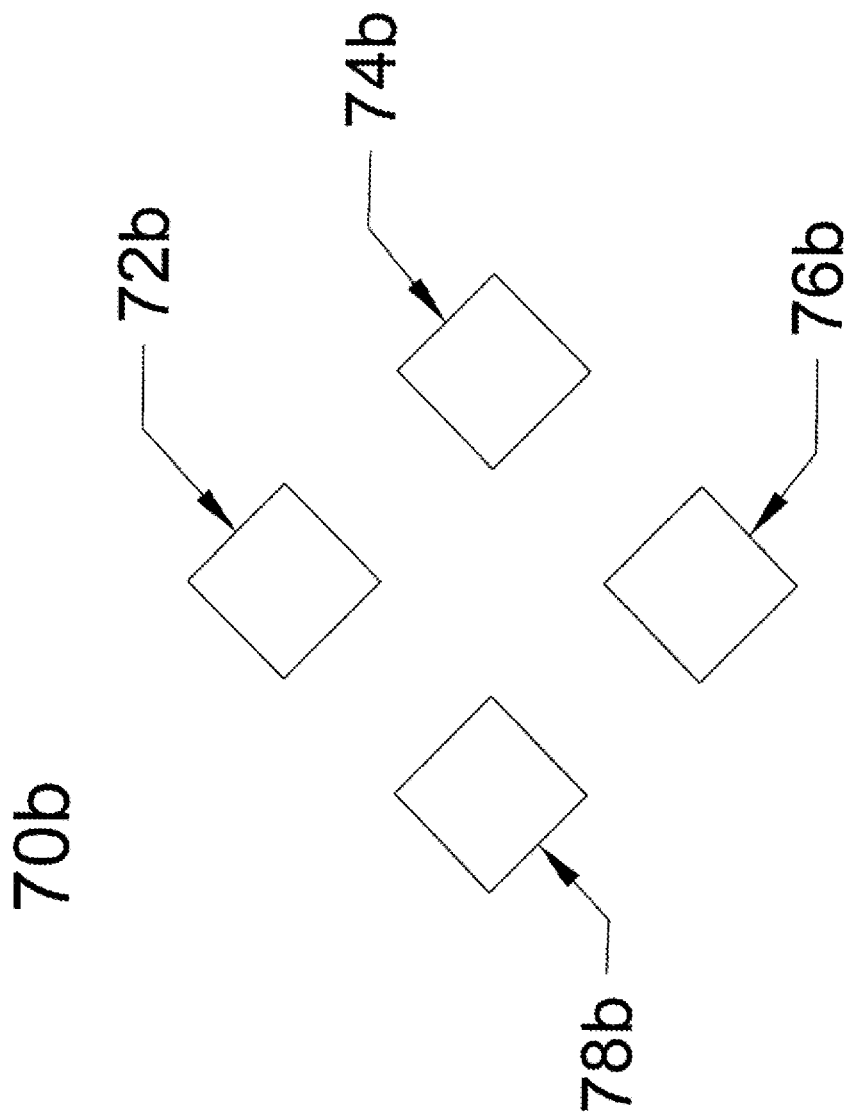

ULTRA-THIN METALLIC FOIL FOR
LIGHTNING STRIKE PROTECTION

FIELD OF THE INVENTION

This invention relates to a metallic foil used for lightning strike protection in composite aerospace structures and more particularly to such a metallic foil which is ultra-thin and light weight and yet has very low resistivity.

BACKGROUND OF THE INVENTION

Aluminum has been the principal material used in aircraft and aerospace construction for the past 60 years. With the growing interest to construct more efficient aircraft, manufacturers are designing more components out of light-weight composite materials. Current composite structures include the fuselage, wing skins, engine nacelles, control surfaces, wing tips (winglets), and even rotary blades on helicopters and wind turbines. Composites, however, are poor conductors of electrical current. Without proper protection, composite materials are susceptible to severe damage in the event of a lightning strike. To date, aircraft manufacturers have used aluminum or copper expanded foils or woven wire mesh incorporated into the surface of these composite structures to dissipate lightning strike energy and prevent damage to the composite material.

Of the two approaches, expanded metal foils have become the industry standard and are superior to woven wire as they do not unravel or have loose strands that may become problematic during processing into a pre-preg material or when conducting a dry lay-up as part of the composite manufacturing process. The homogenous design of expanded metal foils also ensures uncompromised conductivity even when forming the material into a variety of shapes and contours and it provides a smooth surface on the end product. Expanded metal foils used in this application must be manufactured with tight tolerances to meet a specific weight, open area, and conductivity requirements.

Aircraft manufactures use design guidelines, such as those set forth by SAE International in its Aerospace Recommended Practice (ARP) 5414, which defines lightning strike zones (areas of the aircraft more susceptible to lightning strikes (e.g. Zone 1A, 1B). It also provides required electrical withstand capabilities for such strike zones. For example, often materials are required to have the ability to withstand a Zone 1A strike of 200,000 amps. For expanded foils, due to the limitations of the expansion process, the thinnest material possible to meet this criteria to date has been produced using 42 micron foils. The weight of this material is 175 grams per square meter, the resistivity is 3.6 milliohms per square, and the foil has 56% open area. A way to characterize the performance of foils in this application is to assess the foil's weight to conductivity ratio, with conductivity being the inverse of resistivity and represented in gram-ohms per square. For the above expanded foil, its weight to conductivity ratio is 0.63 gr-ohms.

Aircraft manufacturers are always looking for ways to increase efficiency, reduce costs, improve fuel economy, and reduce the amount of $CO_2$ emissions. One clear way to achieve these objectives is to reduce aircraft weight. By reducing the weight of the composite material, the overall weight of the aircraft may be reduced; however, the conductivity criteria required for specific strike zones per SAE ARP5414 must still be satisfied. Thus, it would be desirable to produce thinner and lighter foils, which still meet the required electrical withstand capabilities. Another way of stating this is that it would be very desirable to minimize the foil weight to conductivity ratio.

SUMMARY OF THE INVENTION

The benefits and advantages of the present invention over existing systems will be readily apparent from the Detailed Description to follow. One skilled in the art will appreciate that the present teachings can be practiced with embodiments other than those summarized or disclosed below.

In one aspect the invention features a metallic foil for lightning strike protection in a composite aerospace structure. The metallic foil comprising copper or a copper alloy having a length, a width, a thickness of not more than 30 microns. There are a plurality of pores of a predefined geometric shape extending through the thickness of the metallic foil and being distributed across a surface area defined by the length and the width of the metallic foil. The plurality of pores in the aggregate define an open area of not more than 40% of the surface area. The metallic foil has a weight of not more than 115 g/m² and a weight to conductivity ratio of not more than 0.40 gram-ohms per square.

In other aspects of the invention one or more of the following features may be included. The predefined geometric shape of the plurality of pores may be non-circular. The predefined geometric shape of the plurality of pores may be one or more of elliptical, diamond, oval, hexagonal, and square. The area of each of the predefined geometric shapes may be between $0.5 \times 10^{-3}$ and $5.0 \times 10^{-3}$ square inches. A strand width between the predefined geometric shapes may be not greater than 0.050 inches. The metallic foil may have an isotropic resistance. The top surface and the bottom surface may include a coating of an inert material that is resistant to tarnishing and oxidation. The top surface and the bottom surface may include a coating of silane to improve adhesion to other surfaces.

In yet another aspect, the invention features a metallic foil for lightning strike protection in a composite aerospace structure, wherein the metallic foil comprises aluminum or an aluminum alloy having a length, a width, a thickness of not more than 30 microns. There are a plurality of pores of a predefined geometric shape extending through the thickness of the metallic foil and being distributed across a surface area defined by the length and the width of the metallic foil. The plurality of pores in the aggregate define an open area of not more than 40% of the surface area. The metallic foil has a weight of not more than 35 g/m² and a weight to conductivity ratio of not more than 0.19 gram-ohms per square.

In further aspects of the invention one or more of the following features may be included. The predefined geometric shape of the plurality of pores may be non-circular. The predefined geometric shape of the plurality of pores may be one or more of elliptical, diamond, oval, hexagonal, and square. The area of each of the predefined geometric shapes may be between $0.5 \times 10^{-3}$ and $5.0 \times 10^{-3}$ square inches. A strand width between the predefined geometric shapes may be not greater than 0.050 inches. The metallic foil may have an isotropic resistance. The top surface and the bottom surface may include a coating of an inert material that is resistant to tarnishing and oxidation. The top surface and the bottom surface may include a coating of silane to improve adhesion to other surfaces.

In an additional aspect, the invention features a method of making a metallic foil for lightning strike protection in a composite aerospace structure. The method includes providing a metallic foil comprising a copper or a copper alloy having a length, a width, and a thickness of not more than 30 microns. The method also includes forming in the metallic foil a plurality of pores of a predefined geometric shape extending through the thickness of the metallic foil and being distributed across a surface area defined by the length and the width of the metallic foil. The plurality of pores in the aggregate define an open area of not more than 40% of the surface area. The metallic foil has a weight of not more than 115 g/m² and a weight to conductivity ratio of not more than 0.40 gram-ohms per square.

In other aspects of the invention one or more of the following features may be included. The predefined geometric shape of the plurality of pores may be one or more of elliptical, diamond, oval, and square. The area of the predefined geometric shapes may be between $0.5 \times 10^{-3}$ and $5.0 \times 10^{-3}$ square inches and wherein a strand width between the predefined geometric shapes is not greater than 0.050 inches. The step of forming may include perforating the plurality of pores in the metallic foil. The step of perforating may be accomplished using a perforating die to pierce the metallic foil. The step of perforating may be accomplished using a laser to cut or ablate the metallic foil.

In a further aspect, the invention features method of making a metallic foil for lightning strike protection in a composite aerospace structure, including providing a metallic foil comprising an aluminum or an aluminum alloy having a length, a width, and a thickness of not more than 30 microns. The method includes forming in the metallic foil a plurality of pores of a predefined geometric shape extending through the thickness of the metallic foil and being distributed across a surface area defined by the length and the width of the metallic foil. The plurality of pores in the aggregate define an open area of not more than 30% of the surface area. The metallic foil has a weight of not more than 35 g/m² and a weight to conductivity ratio of not more than 0.19 gram-ohms per square.

In other aspects of the invention one or more of the following features may be included. The predefined geometric shape of the plurality of pores may be one or more of elliptical, diamond, oval, and square. The area of the predefined geometric shapes may be between $0.5 \times 10^{-3}$ and $5.0 \times 10^{-3}$ square inches and wherein a strand width between the predefined geometric shapes may be not greater than 0.050 inches. The step of forming includes perforating the plurality of pores in the metallic foil. The step of perforating may be accomplished using a perforating die to pierce the metallic foil. The step of perforating may be accomplished using a laser to cut or ablate the metallic foil.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein:

FIG. 2B is a perspective view of a portion of a prior art expanded foil;

FIG. 4B is a plan view of a portion of a foil according to an aspect of the invention having diamond-shaped pores;

FIG. 4C is a plan view of a portion of a foil according to an aspect of the invention having oval-shaped pores;

FIG. 5A is a plan view of a portion of a foil according to an aspect of the invention having circular-shaped pores spaced such that the foil has isotropic resistance; and FIG. 5B is a plan view of a portion of a foil according to an aspect of the invention having square-shaped pores spaced such that the foil has isotropic resistance;

DETAILED DESCRIPTION OF THE INVENTION

Figure 1:
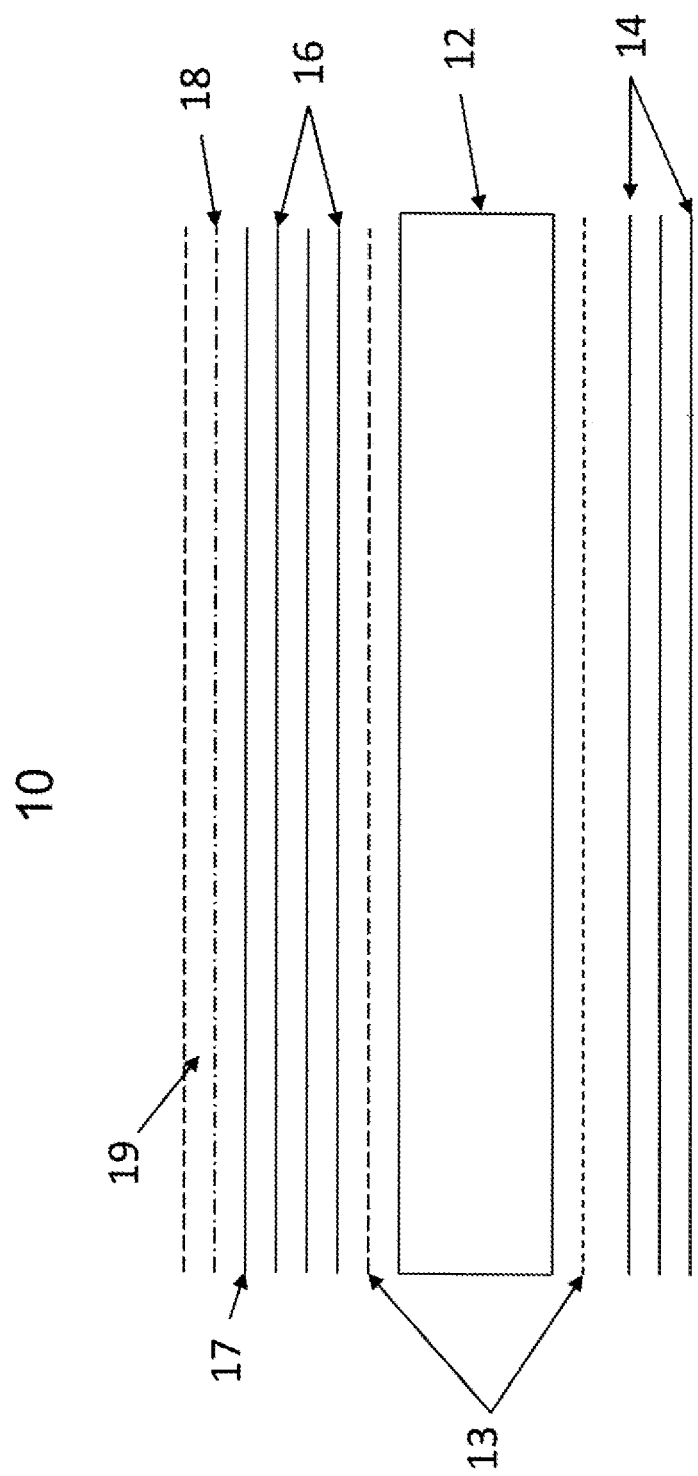
FIG. 1 is a cross sectional view of a composite panel including a metallic foil according to an aspect of this invention.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Moreover, all listed values throughout the specification are nominal values and are subject to normal manufacturing tolerances.

Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The metallic foil according to an aspect of the invention is designed to be ultra-thin, very light weight, and to have very low resistivity. As a result, very low weight to conductivity ratios may be achieved. With these characteristics the foil may be used to protect aircraft from lightning strikes of a significant magnitude (e.g. Zone 1A strikes of 200 amps or more), while allowing the aircraft manufacturer to produce a lighter weight and more efficient aircraft. The metallic foil is also configured to provide optimal adhesive qualities so that it can be layered into and effectively adhered to composite structures. The typical types of metallic material which may be used are copper, aluminum, and alloys thereof.

For a copper or copper alloy foil herein, the thickness may be not more than 30 microns. The foil may have a plurality of pores which, in the aggregate, define an open area of not more than 40% of the surface area. The weight of the foil may be not more than 115 g/m². The foil may have a resistance of not more than 3.5 milliohms per square. This yields a weight to conductivity ratio of 0.40 gr-ohms. Compared with the 42 micron thick expanded copper foil described above, which has a 0.63 gr-ohms weight to conductivity ratio, this is over a 35% improvement. With the foils and processing used herein, it is expected that copper or copper alloy foils as thin as approximately 12 microns would be achievable with comparable weight to conductivity ratios.

For an aluminum or aluminum alloy foil herein, the thickness may be not more than 30 microns. The foil may have a plurality of pores which, in the aggregate, define an open area of not more than 40% of the surface area. The weight of the foil may be not more than 35 g/m$^2$. The foil may have a resistance of not more than 5.5 milliohms per square. This yields a weight to conductivity ratio of 0.19 gr-ohms. Compared with the 0.63 gr-ohms of the expanded copper foil, this is over a 70% improvement in the weight to conductivity ratio. With the foils and processing used herein, it is expected that aluminum or aluminum alloy foils as thin as approximately 12 microns would also be achievable with comparable weight to conductivity ratios.

Foil characteristics such as thickness, weight, and resistivity are readily quantifiable; however, adhesion is not. For purposes of our description, good adhesion of the foil to a composite panel after a curing cycle is one that prevents substantial peeling (e.g. less than 25%) of the foil upon application of a high water jet device following, for example, Volvo STD1049.5134, with the following parameters: pressure, duration, distance, sweeping angle, sweeping frequency, water temperature, maximum peeled surface. The values for these parameters may be defined based of the requirements of the particular application.

To provide context, the metallic foil according to an aspect of the invention is shown embedded in a cross-section of a composite panel 10, FIG. 1, which may be used to construct the fuselage of an aircraft, for example. The composite panel 10 includes a honeycomb core 12 sandwiched between a first plurality of carbon plies 14 and second plurality of carbon plies 16. The plurality of carbon plies 14 are affixed to the bottom of honeycomb 12, using a bonding adhesive 13, such as epoxy resin, which plurality of plies 14 may be on the bag-side, i.e. the side of the composite panel that is cured against the vacuum bag. The plurality of carbon plies 16 are affixed to the top side of honeycomb 12 also with adhesive 13. The metallic foil 18, according to this invention, may be affixed directly to carbon plies 16 or to an optional isolation ply 17, interposed between metallic foil 18 and carbon plies 16. Finally, a surfacing film 19 (e.g. an epoxy-based resin) may be secured to metallic foil 18 or, alternatively, foil 18 may be embedded within surfacing film 19.

Figure 2A:
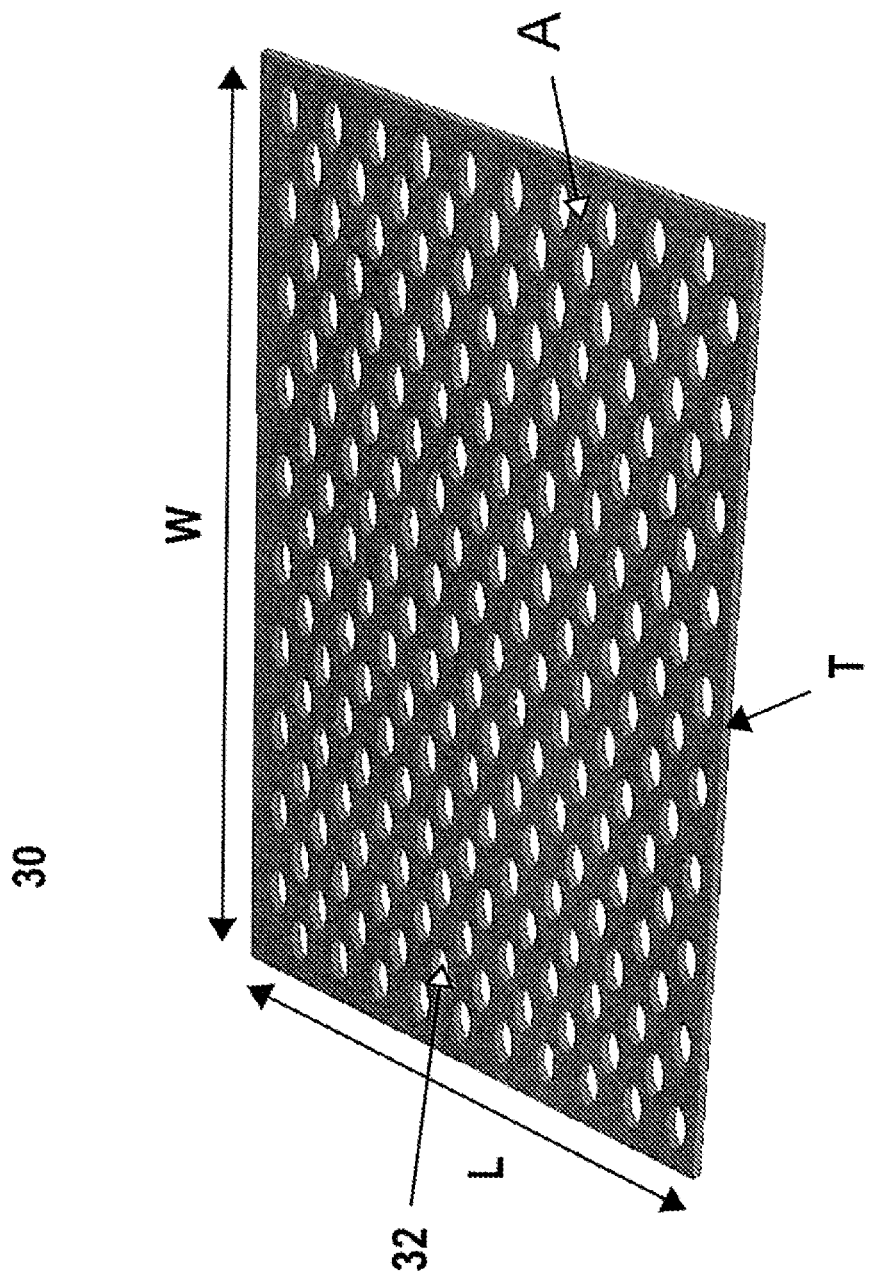
FIG. 2A is a perspective view of a portion of a foil according to an aspect of the invention.

Referring to FIG. 2A, a perspective view of a portion 30 of metallic foil 18 is shown. Portion 30 of foil 18 is shown to have a length, L, and a width, W, which define a surface area, A, of L*W. Distributed across surface area A are a plurality of pores or openings 32, which extend through the thickness, T, of the foil. As noted above, T may be ultra-thin (i.e. 30 microns or less). For comparison, a portion 40 of an expanded material having a thickness, TE, of approximately 42 microns, is depicted in FIG. 2B. As described above, this is the thinnest expanded material currently manufactured. Expanded material is produced by slitting and stretching a material having a greater starting thickness to form a thinner material having a plurality of pores/openings 42, which in this case are diamond-shaped. As noted above, due to the limitations of the expansion process, this is the thinnest material achievable while still meeting the low resistivity/high conductivity and strength requirements.

Thinner foils are achievable according to this invention; however, the pore size and spacing, as well as the amount of open area relative to total foil area must be optimized to achieve desired weight, strength, adhesion capability, and conductivity. Portion 30 of foil 18 in this example has uniformly spaced elliptical-shaped pores, which may be formed in the foil by mechanically punching the material or using a laser to cut or ablate the material to form the pores. It is apparent from FIGS. 2A and 2B that the expanded material portion 40 has a greater amount of open area (defined by aggregate area of pores 42) relative to total area, $A_E$ ($L_E*W_E$), than does portion 30 of foil 18, which has less open area (defined by aggregate area of pores 32) relative to total area, A. Limiting the open area allows the metallic foil 18 to be made much thinner while still achieving the required strength and resistivity characteristics.

Before describing in more detail below how the open area in metallic foil 18 may be formed with pores of different shapes, sizes, spacing and patterns the manufacturing process for such metallic foils is described.

Figure 3:
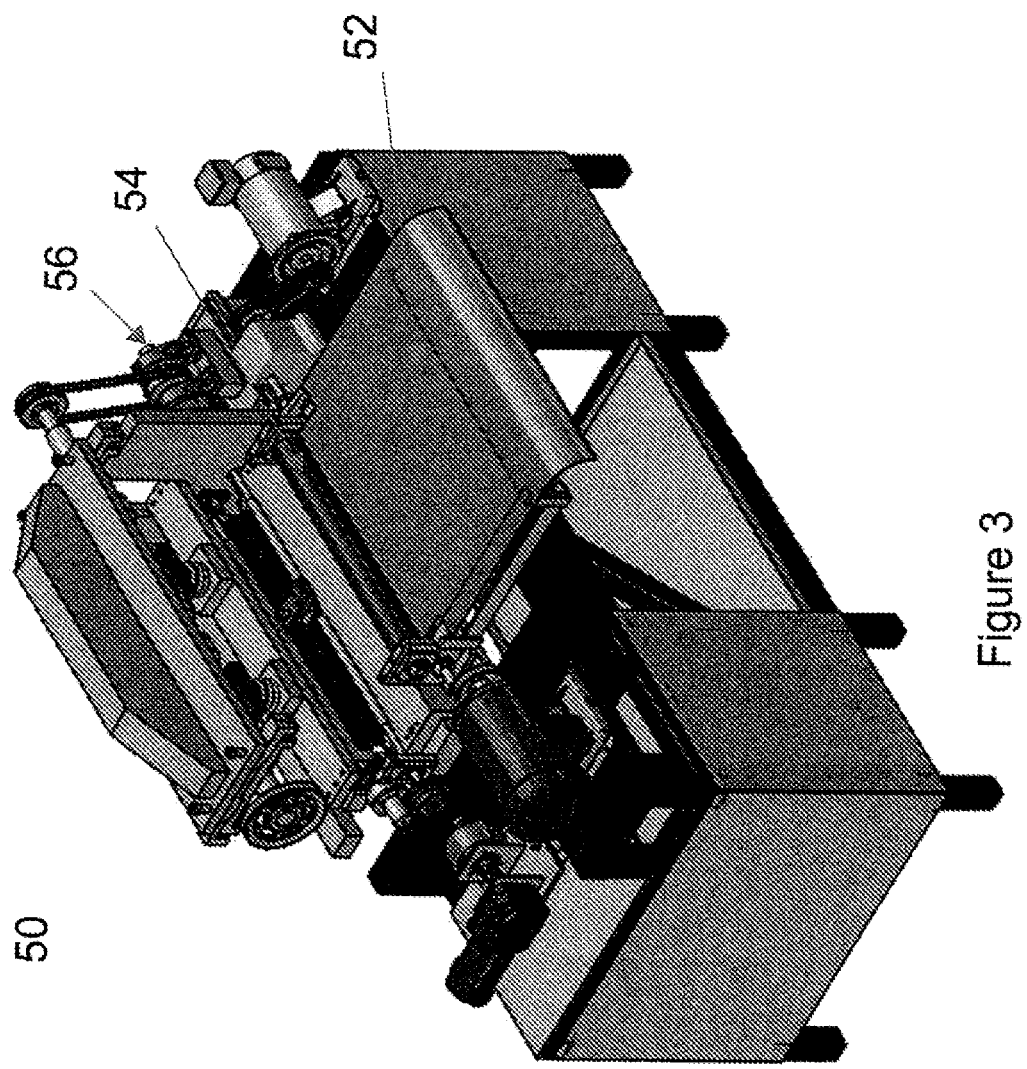
FIG. 3 is a perspective view of a perforating machine for producing a metallic foil according to an aspect of this invention.

A method of manufacturing of the ultra-thin metallic foil according to an aspect of this invention may include an in-line process of perforating the metallic foil with specifically sized and spaced holes of various geometric shapes to achieve desired performance characteristics. This may be accomplished using a perforating machine, such as machine 50 depicted in FIG. 3. The aerospace industry demands that these thin perforated foils be produced at widths exceeding 37 inches, which is outside the process limits for typical perforating equipment. Also, the foils must be substantially free of burrs, tears and contaminants. This requires the use of precision perforating dies and equipment, which may be obtained commercially from reel-to-reel perforating machine builders.

A key element of the die-based perforation process is the use of a backing material, such as 40 lb Kraft paper, to "carry" the ultra-thin foils through the perforating process. The use of the carrier essentially adds thickness to the material being perforated, which prevents tearing and also helps to provide a precise, sharp cut with minimal burring. Referring again to FIG. 3, a wide web of metallic foil 52 (of 37 inches or more) with backing material (not visible) is shown being fed under roller 54 and into the cutting dies 56. The backing material also helps to control tension of the metal foil 52 as it traverses through the cutting dies 56. While not shown in this view, the web of solid foil 52 may be processed in a reel to reel operation. In other words, solid metallic foil 52 with backing material may be fed into machine 50 via a pay-out reel and the web of perforated metallic foil may be received from machine and collected on a take-up reel.

An alternate approach to using a mechanical die-based perforating machine, such as machine 50, would be to use a reel-to-reel galvanometric laser to accomplish the precision cutting/ablating to manufacture the metallic coils according to an aspect of this invention. Although more costly, laser technologies have advanced to the point where this process is an effective alternative to die-based perforating, especially since the material is thin and pore sizes are relatively small.

The metallic foil 52 may be pretreated to improve its durability and adhesion characteristics. In addition, the metallic foil may be passivated, which creates an inert surface that is resistant to tarnishing and oxidation. Also, the metallic foil may be coated with silane, which helps to provide the material with improved adhesion characteristics.

By perforating the thin metallic foil 52, a plurality of openings of a predefined geometric shape extending through the thickness of the metallic foil and being distributed across a surface area may be formed. The aggregate amount of open area formed by the openings is configured to provide maximum conductivity while maintaining as light a weight as possible, which may be as light as 115 grams per square meter or less. Sizing of the openings/perforations is very important in order to maintain desired strength, conductivity, and effective adhesion properties and the following sections describe exemplary methods for designing the open area for metallic foils according to this invention.

Open Area

The open area of the metallic foil according to this invention generally needs to be below 40% of the overall surface area of the metallic foil in order to maintain sufficient strength and conductivity. Without sufficient strength, the foil will tear or break when incorporating it into into a pre-preg or surfacing film and/or during manufacturing the composite laminate structure. Without enough foil material, the required amount of conductivity needed to absorb the significant electrical current generated during a lightning strike will not be achieved. At the same time, it is desired to maximize open area to minimize the weight and allow the laminate adhesives to effectively seep through the perforations and create "wet-out" uniformly to the outer surface of the structure, releasing any air bubbles and creating a smooth, homogeneous strong bond between the layers of the composite. In comparison, prior to the current metallic foils, the lowest amount of open area in expanded foils is approximately 55% open area, but thicker and heavier material must be used to provide the required strength and conductivity.

For proper adhesion, the pore area is optimal when it is between $0.5 \times 10^{-3}$ and $5.0 \times 10^{-3}$ square inches. Historically, lightning strike applications have primarily utilized either a woven material, which yields a square pattern, or expanded material, which yields a diamond or hexagonal shapes. By using perforated pores, different shapes may be used, including ovals, circles, and elliptical shapes. The most efficient shapes, in terms of electric field lines, are rounded, as sharp corners that are necessarily prevalent in woven or expanded materials create higher flux density in the areas of the sharp corners. These higher flux areas naturally increase the measured resistivity of the material.

Figure 4A:
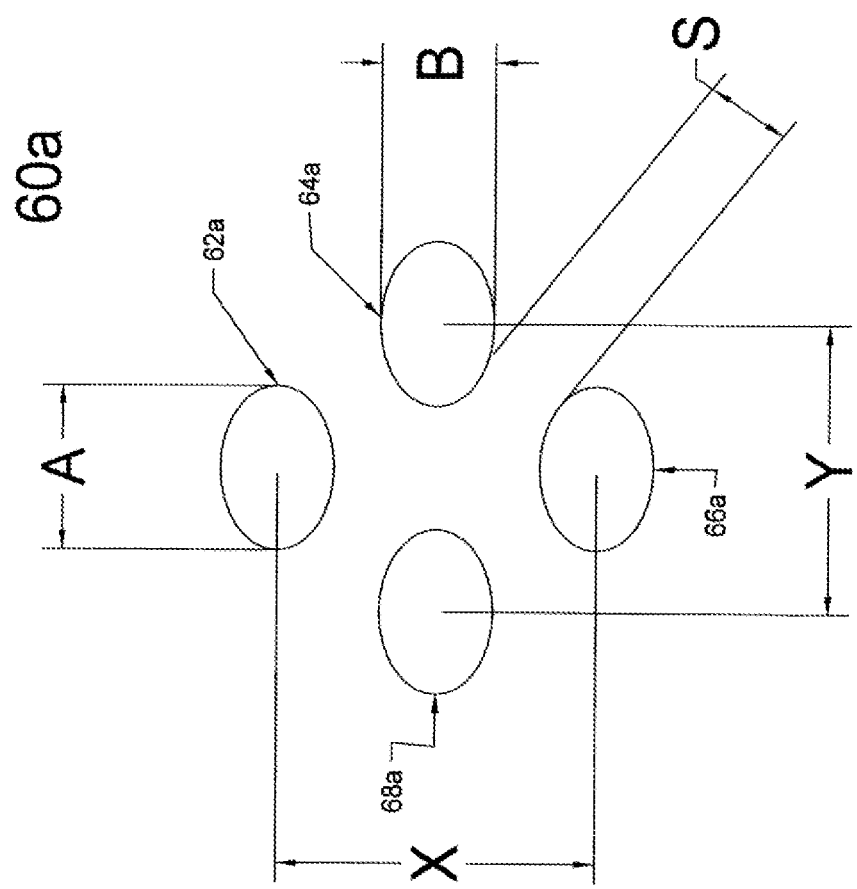
FIG. 4A is a plan view of a portion of a foil according to an aspect of the invention having elliptically-shaped pores.

Referring to FIG. 4A, a portion 60a of a foil is shown to include equally sized, elliptically-shaped pores 62a, 64a, 66a, and 68a. The pores may be sized as required for a particular application as long as the length, A, and width, B, provide an overall area of the pores between $0.5 \times 10^{-3}$ and $5.0 \times 10^{-3}$ square inches, as required to achieve proper adhesion. With pores of a larger size, spacing between pores (or strand width, S) to obtain the desired conductivity tends to be too wide, thereby increasing the risk of adhesion difficulties. The strand width, S, is desired to be below 0.050 inches (1.25 mm) for proper adhesion.

The open area of material may be determined by the following equation:

$$\text{Open Area} = 1 - \text{Desired Weight}/(\text{Thickness} \times \text{Density}) \quad (1)$$

As an example, taking a desired weight of 100 grams per square meter (gsm) and using 17 micron thick copper as the desired material, which has a density of $8.89 \times 10^6$ g/m³, the open area is determined to be:

$$\text{Open Area} = 1 - 100/(17 \times 10^{-6} \times 8.89 \times 10^6) = 33.8\% \quad (2)$$

As noted above, open area of less than 40% of the overall surface area of the metallic foil is required in order to maintain sufficient strength and conductivity. Therefore, 17 micron thick copper material having a weight of 100 gsm will be suitable to produce a metallic foil according to the invention.

Pore Spacing

Once the targeted open area, pore size and shape are selected, the spacing of the pores can be determined to achieve the resulting configuration. Carrying on with the example above, for an elliptical shape pore, calculations are as follows:

$$\text{Area of ellipse: pi} \ast \text{pore length}(A)/2 \ast \text{pore height}(B)/2 \quad (3)$$

$$\text{Open area} = \text{ellipse area} \ast 2/(X) \ast (Y) \quad (4)$$

With spacing between pores being equal in both X and Y directions:

$$X = \text{SQRT}((3.1416 \ast A \ast B/2)/(\text{open area})) \quad (5)$$

Using as an example, an elliptical pore size of 0.060×090 inches, with a desired open area of 33.8%:

$$X = \text{SQRT}(3.1416 \times 0.06 \text{ in} \times 0.09 \text{ in}/2/0.32) = 0.158 \text{ in} \quad (6)$$

With a pore spacing of 0.158 inches, this configuration measures a strand width ("S") of approximately 0.049 inches or 31% of X/Y. Since 0.050 inches is the largest targeted strand width, S, as noted previously, this pore size would approximately be the maximum size recommended for this material for use in a lightning strike application.

Similar configurations can be implemented with the above pore dimensions using different shapes, including diamonds and ovals. Referring to FIG. 4B, a portion 60b of a foil is shown to include equally sized, diamond-shaped pores 62b, 64b, 66b, and 68b, which may be used to form a 17 micron thick copper foil suitable for lightning strike applications. Referring to FIG. 4C, a portion 60c of a foil is shown to include equally sized, oval-shaped pores 62c, 64c, 66c, and 68c which also may be used to form a 17 micron thick copper foil suitable for lightning strike applications.

Using ovals, ellipses, or diamond shape pores, as shown in FIGS. 4A-4C, will produce very low resistivity foils, however, the resistivity will not be equal in all direction, i.e. it will be "anisotropic". The resistivity along the "X" direction versus along the "Y" direction will differ depending upon the spacing and length to height ratio of the pores. It is sometimes desired to utilize a foil with conductive properties that are approximately equal in all directions, i.e. "isotropic". To achieve isotropic features for conductivity, a symmetrical pattern may be used, either in the form of circles or squares.

Referring to FIG. 5A, a portion 70a of a foil is shown to include equally sized, and symmetrically spaced circle-shaped pores 72a, 74a, 76a, and 78a. Referring to FIG. 5B, a portion 70b of a foil is shown to include equally sized, and symmetrically spaced square-shaped pores 72b, 74b, 76b, and 78b. In both configurations, the foil may be designed to be isotropic in terms of resistance and also suitable for lightning strike applications by having the desired strength, conductivity, and effective adhesion properties described above.

The following is a table of exemplary configurations using 18 micron copper foil, including differing geometric shapes and sizes that have been determined to optimally meet adhesion, thickness, weight, and conductivity requirements according to this invention.

TABLE 1

18 micron Copper

| Shape | Opening Size (in.) | Opening Area (in.$^2$) | Spacing (in. × in.) Along Width (in.) | Spacing (in. × in.) Along Length (in.) | Open Area (%) | Resistance Width: Length | Max Resistance (mohms/sq) | Weight (grams) | Weight: Min Conductivity Ratio (gr-ohms) |
|---|---|---|---|---|---|---|---|---|---|
| Circular | .060 dia | 0.0028 | 0.175 | 0.100 | 32% | 1:1 | 2 | 103 | 0.21 |
| Elliptical | .060 × .040 | 0.0019 | 0.110 | 0.110 | 31% | 1.3:1 | 2.6 | 105 | 0.27 |
| Elliptical | .080 × .035 | 0.0022 | 0.150 | 0.090 | 33% | 1.8:1 | 3.4 | 103 | 0.35 |
| Diamond | .088 × .044 | 0.0019 | 0.110 | 0.110 | 32% | 1.4:1 | 2.8 | 103 | 0.29 |
| Oval | .077 × 0.050 | 0.0032 | 0.144 | 0.144 | 31% | 1.3:1 | 2.4 | 106 | 0.25 |
| Square | .054 × .054 | 0.0029 | 0.126 | 0.126 | 37% | 1:1 | 2.5 | 97 | 0.24 |

In Table 1 are included the specifications of the pores contained in various 18 micron foils made of copper, including perforation shape, size (dimensions and area), and spacing. Also included are the amount of open area in each foil design, weight, maximum resistance, and resistance characteristics, i.e. isotropic or anisotropic. With the anisotropic foils the resistance ratio across the width of the foil relative to the resistance along the length of the foil differs (e.g. 1.3:1), while the isotropic foils have a ratio of 1:1.

The following is a table of exemplary configurations using 25 micron aluminum foil, including differing geometric shapes and sizes that have been determined to optimally meet adhesion, thickness, weight, and conductivity requirements according to this invention.

TABLE 2

25 micron Aluminum

| Shape | Opening Size (in.) | Opening Area (in.$^2$) | Spacing (in. × in.) Along Width (in.) | Spacing (in. × in.) Along Length (in.) | Open Area (%) | Resistance Width: Length | Max Resistance (mohms/sq) | Weight (grams) | Weight: Min Conductivity Ratio (gr-ohms) |
|---|---|---|---|---|---|---|---|---|---|
| Circular | .060 dia | 0.0028 | 0.175 | 0.100 | 32% | 1:1 | 4.5 | 23 | 0.10 |
| Elliptical | .060 × .040 | 0.0019 | 0.110 | 0.110 | 31% | 1.3:1 | 5.8 | 23 | 0.14 |
| Diamond | .088 × .044 | 0.0019 | 0.110 | 0.110 | 32% | 1.4:1 | 6.3 | 23 | 0.14 |
| Oval | .077 × 0.050 | 0.0032 | 0.144 | 0.144 | 31% | 1.3:1 | 5.4 | 23 | 0.12 |
| Square | .054 × .054 | 0.0029 | 0.126 | 0.126 | 37% | 1:1 | 5.6 | 21 | 0.12 |

While we have described several specific examples of metallic foils, these are not intended to limit the invention and, using the design criteria provided herein, many different configurations of foils may be produced for various applications. Accordingly, many foil designs falling within the bounds of the invention may be produced with very beneficial attributes; namely, foils that are ultra-thin (i.e. 30 microns or less), very light weight (i.e. 115 grams/m$^2$ or less), and very low weight to conductivity ratios (i.e. 0.40 gram-ohms). Notwithstanding broad range of foil designs possible, the following general parameters for an optimized design are provided: opening size area of $0.5 \times 10^{-3}$ to $5.0 \times 10^{-3}$ square inches, open area between 25% and 35%, and spacing maintained between 0.100 and 0.300 inches. Foils with these criteria allow for very good adhesion and conductivity in both directions while also providing a very light weight foil.

It should be noted that some possible foil designs may have higher resistivity values, such as the 25 micron aluminum films in Table 2. These foils have resistivity values from 4.5-6.3 milliohms per square, which exceeds the maximum value of 3.5 milliohms per square for zone 1A lightning strike protection. However, these foils still have very low weight to conductivity ratios and are very good candidates for less intense lightning strike protection, e.g. Zone 2 lightning strike protection.

In comparison to the prior art expanded foil, the weight to conductivity ratio is significantly improved, with the current foil while still maintaining good adhesion properties. This is due to the reduced foil thickness and specific pore geometry and spacing. For the 18 micron copper foil samples from Table 1, improvements in weight to conductivity ratios of greater than 50-65% relative to the 42 micron expanded foil described above may be obtained. And, even greater improvements can be obtained with the aluminum foil. For the 25 micron aluminum foil samples from Table 2, improvements in weight to conductivity ratios of greater than 75-80+% relative to the 42 micron expanded foil may be obtained While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by Letters Patent is:

We claim:

1. A composite aerospace structure including a metallic foil for lightning strike protection comprising:
   a copper or a copper alloy having a length, a width, a thickness of not more than 30 microns, and a plurality of pores of a geometric shape extending through the thickness of the metallic foil and being distributed across a surface area defined by the length and the width of the metallic foil;
   wherein the plurality of pores in the aggregate define an open area of not more than 40% of the surface area;
   wherein the metallic foil has a weight of not more than 115 g/m$^2$;
   wherein the metallic foil has a weight to conductivity ratio of not more than 0.40 gram-ohms per square; and,
   wherein the composite aerospace structure includes at least one layer of carbon plies and a surfacing film, and wherein the copper or copper alloy is embedded in the composite aerospace structure.

2. The composite aerospace structure of claim 1 wherein the geometric shape of the plurality of pores is non-circular.

3. The composite aerospace structure of claim 2 wherein the geometric shape of the plurality of pores is one or more of elliptical, diamond, oval, hexagonal, and square.

4. The composite aerospace structure of claim 3 wherein the area of each of the geometric shapes is between $0.5 \times 10^{-3}$ and $5.0 \times 10^{-3}$ square inches.

5. The composite aerospace structure of claim 4 wherein a strand width between the geometric shapes is not greater than 0.050 inches.

6. The composite aerospace structure of claim 1 wherein the top surface and the bottom surface of the metallic foil include a coating of an inert material that is resistant to tarnishing and oxidation.

7. The composite aerospace structure of claim 1 wherein the top surface and the bottom surface of the metallic foil include a coating of silane to improve adhesion to other surfaces.

8. The composite aerospace structure of claim 1 wherein the copper or copper alloy is embedded in the surfacing film.

9. The composite aerospace structure of claim 1 wherein the copper or copper alloy is disposed between the layer of carbon plies and the surfacing film.

10. A method of making a composite aerospace structure with a metallic foil for lightning strike protection, the method comprising:
    providing a metallic foil comprising a copper or a copper alloy having a length, a width, and a thickness of not more than 30 microns;
    forming in the metallic foil a plurality of pores of a geometric shape extending through the thickness of the metallic foil and being distributed across a surface area defined by the length and the width of the metallic foil;
    wherein the plurality of pores in the aggregate define an open area of not more than 40% of the surface area;
    wherein the metallic foil has a weight of not more than 115 g/m$^2$; and
    wherein the metallic foil has a weight to conductivity ratio of not more than 0.40 gram-ohms per square; and,
    embedding the metallic foil in the composite aerospace structure, the composite aerospace structure comprising at least one layer of carbon plies and a surfacing film.

11. The method of claim 10 wherein the geometric shape of the plurality of pores is one or more of elliptical, diamond, oval, and square.

12. The method of claim 11 wherein the area of the geometric shapes is between $0.5 \times 10^{-3}$ and $5.0 \times 10^{-3}$ square inches and wherein a strand width between the geometric shapes is not greater than 0.050 inches.

13. The method of claim 10 wherein the step of forming includes perforating the plurality of pores in the metallic foil.

14. The method of claim 13 wherein the step of perforating is accomplished using a perforating die to pierce the metallic foil.

15. The method of claim 14 wherein the step of perforating is accomplished using a laser to cut or ablate the metallic foil.

* * * * *